United States Patent
Wasiewicz et al.

(10) Patent No.: US 9,223,009 B1
(45) Date of Patent: Dec. 29, 2015

(54) METHOD AND SYSTEM FOR ELECTROMAGNETIC INTERFERENCE (EMI) MITIGATION USING AN AUXILIARY RECEIVER

(75) Inventors: Richard Wasiewicz, Tully, NY (US); Peter H. Stockmann, Jamesville, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 584 days.

(21) Appl. No.: 13/330,385

(22) Filed: Dec. 19, 2011

(51) Int. Cl.
| | | |
|---|---|---|
| H04W 16/14 | (2009.01) | |
| G01S 7/02 | (2006.01) | |
| H04W 72/08 | (2009.01) | |
| H04L 27/00 | (2006.01) | |

(52) U.S. Cl.
CPC ............. *G01S 7/023* (2013.01); *H04L 27/0006* (2013.01); *H04W 16/14* (2013.01); *H04W 72/082* (2013.01)

(58) Field of Classification Search
CPC ......... G01S 7/023; H04B 1/74; H04W 16/14; H04W 72/082; H04W 24/02; H04W 24/04; H04W 24/08; H04W 24/00; H04L 27/0006
USPC .............................. 342/18; 455/63.3; 343/801
See application file for complete search history.

(56) References Cited

U.S. PATENT DOCUMENTS

| | | | | |
|---|---|---|---|---|
| 3,456,198 | A | | 7/1969 | Black |
| 3,648,287 | A | * | 3/1972 | Lind ................................ 342/18 |
| 4,135,189 | A | * | 1/1979 | Josse ................................ 342/18 |
| 4,328,497 | A | * | 5/1982 | Vale ................................. 342/18 |
| 4,358,766 | A | * | 11/1982 | Mehron ........................... 342/18 |
| 4,853,903 | A | | 8/1989 | Linville, Jr. et al. |
| 5,017,921 | A | * | 5/1991 | McGill et al. .................... 342/18 |
| 5,051,963 | A | | 9/1991 | Linville, Jr. et al. |
| 5,483,666 | A | * | 1/1996 | Yamada et al. ............... 455/454 |
| 5,600,326 | A | | 2/1997 | Yu et al. |
| 5,669,062 | A | * | 9/1997 | Olds et al. ...................... 455/509 |
| 5,828,293 | A | * | 10/1998 | Rickard ......................... 375/257 |
| 6,034,650 | A | * | 3/2000 | Kuramoto ..................... 343/895 |
| 6,047,175 | A | * | 4/2000 | Trompower ............... 455/452.1 |
| 6,215,982 | B1 | * | 4/2001 | Trompower ................. 455/63.3 |
| 6,529,568 | B1 | | 3/2003 | Richards et al. |

(Continued)

OTHER PUBLICATIONS

Kumaravel, N. and Nithiyanandam, N., "Genetic-algorithm cancellation of sinusoidal powerline interference in electocardiograms", Journal: Medical & Biological Engineering & Computing, Mar. 1998;36(2):191-6.

(Continued)

*Primary Examiner* — Matthew M Barker
(74) *Attorney, Agent, or Firm* — Howard IP Law Group, PC

(57) ABSTRACT

An auxiliary receiver implemented method of providing to a host RF system one or more frequency and bandwidth recommendation for a minimal electromagnetic interference (EMI) near-future transmission, the method including the steps of receiving signals on an antenna such as an omni-directional antenna in a band of operation of the host system 360 degrees in azimuth; analyzing the received signals in the auxiliary receiver; performing a statistical analysis in the auxiliary receiver to predict the one or more frequency and bandwidth recommendation for a minimal EMI near-future transmission; and providing one or more frequency and bandwidth recommendations to the host system.

20 Claims, 8 Drawing Sheets

(56) References Cited

U.S. PATENT DOCUMENTS

| | | | |
|---|---|---|---|
| 6,639,541 B1* | 10/2003 | Quintana et al. | 342/18 |
| 6,720,934 B1* | 4/2004 | Price et al. | 343/801 |
| 7,327,325 B2* | 2/2008 | Schadler et al. | 343/792 |
| 7,453,963 B2 | 11/2008 | Joublin et al. | |
| 7,492,668 B2 | 2/2009 | Chang et al. | |
| 7,526,163 B2* | 4/2009 | Freeland et al. | 385/101 |
| 7,840,384 B2 | 11/2010 | Feldhaus et al. | |
| 7,969,378 B2* | 6/2011 | Bongfeldt et al. | 343/801 |
| 8,514,821 B2* | 8/2013 | Park et al. | 370/337 |
| 8,515,473 B2* | 8/2013 | Mody et al. | 455/509 |
| 8,611,821 B2* | 12/2013 | Nandagopalan et al. | 455/63.1 |
| 8,666,317 B2* | 3/2014 | Choudhury et al. | 455/62 |
| 2002/0171584 A1 | 11/2002 | Walker et al. | |
| 2003/0117314 A1 | 6/2003 | Yu | |
| 2006/0062184 A1 | 3/2006 | Saarnisaari et al. | |
| 2007/0105574 A1* | 5/2007 | Gupta et al. | 455/509 |
| 2007/0107020 A1* | 5/2007 | Tavares | 725/81 |
| 2007/0214286 A1* | 9/2007 | Muqattash et al. | 709/248 |
| 2008/0069079 A1* | 3/2008 | Jacobs | 370/348 |
| 2008/0089451 A1 | 4/2008 | Taylor et al. | |
| 2010/0197233 A1 | 8/2010 | Kim et al. | |
| 2010/0296568 A1 | 11/2010 | Bury | |
| 2013/0022010 A1* | 1/2013 | Qianxi et al. | 370/329 |

OTHER PUBLICATIONS

So, H.C., "A Novel Adaptive Algorithm for Sinusoidal Interference Cancellation", Department of Electric Engineering, pp. 1-8, Oct. 14, 1997.

International Search Report dated Sep. 24, 2012, for International Application No. PCT/US12/42496.

North, Richard C., Zeidler, James R., Albert, Terrance R., Ku, Walter H., "Comparison of Adaptive Lattice Filters to LMS Transversal Filters for sinusoidal Cancellation". IEEE, pp. IV-33-IV-36, 1992.

Xu, Lijun and Yan, Yong, "Wavelet-based removal of sinusoidal interference from a signal", Measurement Science Technology, 15 (2004), 1779-1786.

So, H.C., "Adaptive cancellation of multiple interfering sinusoids", Electronics Letters, vol. 34, No. 24, Nov. 26, 1998.

Abdelkefi, F. et al.: "Impulse noise cancellation in multicarrier transmission"; 2001 IEEE International Conference on Acoustics, Speech, and Signal Processing, 2001. Proceedings; p. 2381-2384 vol. 4.

Yu, Xunyi et al.; "OFDM Channel Estimation with Impulse Noise Cancellation"; International Conference on Wireless Communications, Networking and Mobile Computing, 2007; WiCom 2007; Oct. 8, 2007; p. 330-333; Shanghai.

Kerpez, KJ, "Minimum mean squared error impulse noise estimation and cancellation"; IEEE Transactions on Signal Processing; Jul 1995; vol. 43, Issue; 7; p. 1651-1662.

Zhang, D. et al., "Impulse Noise Detection and Removal Using Fuzzy Techniques"; Electronics Letters; Feb. 27, 1997; vol. 33, Issue 5; p. 378-379.

Pelletier, MG, "Adaptive signal processing for removal of impulse noise from yield monitor signals"; http//hdl.handle.net/10113/12584 USDA, ARS; Journal of cotton science 2001. v.5(4), p. 224-233.

International Search Report dated Sep. 21, 2012, for International Application No. PCT/US12/40532.

* cited by examiner

METHOD AND SYSTEM FOR ELECTROMAGNETIC INTERFERENCE (EMI) MITIGATION USING AN AUXILIARY RECEIVER

FIELD OF THE INVENTION

This invention relates generally to radar systems, and more particularly, to an auxiliary receiver for adjusting one or more of a transmitted waveform time, frequency, and bandwidth to mitigate effects of electromagnetic interference (EMI).

BACKGROUND OF THE INVENTION

Radar systems often utilize a wide, instantaneous bandwidth to enable high range resolution. Radar systems further implement frequency hopping in a burst to burst fashion over a broad agile band to enhance target detection. Radar operating bands are being shared by an increasing number of users, including governmental and commercial mobile communications systems. Other users' transmissions may be considered EMI relative to an intended transmission due to the fact that such "other" transmissions cause undesired interference in the "intended" transmission's operating band. In an attempt to avoid EMI, current radars typically implement a clear channel search function to determine frequencies within an operational band having minimal EMI. Implementation of a clear channel search function involves developing a clear channel map (commonly referred to as a least jammed map or least interference map) over a period of many scans. In this fashion, a clear channel map may take up to several minutes to construct. As the clear channel search function performs the scans, received EMI is integrated over time, thereby showing directions and frequencies on which EMI is detected. A scheduler is configured to process the clear channel map data output frequency, bandwidth, and timing information for EMI-free or minimal EMI signal transmission. Thus, the radar system may avoid transmission on frequencies and directions on which EMI above a threshold value was detected. Because the clear channel search function integrates EMI over a period of time, a frequency may be indicated as containing EMI even though for periods of time much greater than radar dwells, the same frequency contains little or no EMI. For example, users transmit on various frequencies, thereby causing EMI. However, such transmissions do not occur continuously. A police radio may transmit intermittently, typically shutting off for at least one half second between transmissions. Because radar coherent dwells are generally on the order of 1 to 50 milliseconds (ms), a radar could transmit on a frequency also used by another, such as a police radio frequency, by only transmitting during these short, interference-free time intervals.

Alternative systems and methods for mitigating EMI are desired.

SUMMARY OF THE INVENTION

According to an aspect of the present invention, there is disclosed a system and method that mitigates EMI by exploiting the short-lived interference-free time-frequency gaps on the order of a radar dwell. The present invention involves a method to enable a radar system to operate in a crowded band (e.g. a band in which many other users are transmitting) while maintaining frequency hopping, broad instantaneous bandwidths, and/or extended dwell times required for full performance. The method and system involves rapidly analyzing a range of frequencies (e.g. a radar's intended operating band or a portion thereof) over 360 degrees in azimuth and identifying and/or predicting short-lived interference-free time-frequency gaps therein. Data indicative of the determined EMI-free time-frequency gaps may be transmitted to a host radar in real time. The host radar could then utilize the time-frequency gaps to quickly schedule transmissions (e.g. over the next beam dwell or the next burst) to avoid EMI.

An embodiment of the present invention includes an auxiliary receiver configured to rapidly analyze a host radar's band of interest in 360 degrees in azimuth and provide one or more recommendations to a host radar, including waveform frequency and bandwidth for a near-future burst transmission.

Thus there is disclosed a method of providing to a host system one or more frequency and bandwidth recommendations for near future transmissions having reduced electromagnetic interference (EMI) associated with said transmissions, the method comprising: receiving signals via an antenna over a given frequency range; processing the received signals in an auxiliary receiver on a periodic basis to determine EMI data over a given frequency range as a function of time, frequency and bandwidth; statistically analyzing said EMI data to determine one or more candidate frequency and bandwidth slots within said given frequency range, for a near future transmission that does not overlap with said EMI data over the duration of the transmission; and providing or outputting to a host system data indicative of the one or more candidate frequency and bandwidth slots. The host system may be a host radar or telecommunications system. The frequency range may be the band of operation of the host system (i.e. radar or telecommunications system). The periodic basis may be between 10 microseconds and 100 microseconds. The statistical analyzing process comprises dividing the frequency range into a plurality of frequency bands; determining the EMI received on every frequency band as a function of time; tracking the continuous duration that each frequency band remains EMI free; and statistically predicting the duration that one or more EMI free frequency bands remain EMI free.

The antenna may be a collinear dipole antenna having four half-wave dipole elements printed end-to-end on an outer surface of a hollow rigid dielectric cylinder and adapted for 360 degree operation in azimuth.

According to an aspect of the disclosure, an auxiliary receiver is configured to recommend to a host system one or more frequency and bandwidth pair for minimal electromagnetic interference (EMI) near-future transmission, the auxiliary receiver comprising: an antenna configured to receive signals in a band of operation; a receiver configured to receive RF signals from the antenna, determine the EMI on each frequency within the band of operation, and provide a spectrum comprising levels of received EMI on each frequency within the band of operation; and a processor configured to receive and statistically analyze the spectrum, generate one or more frequency and bandwidth predictions for minimal EMI near-future host radar transmissions, and output data indicative of the one or more frequency and bandwidth predictions. The host system may be a host radar or telecommunications system. The frequency range may be the band of operation of the host system (i.e. radar or telecommunications system). The periodic basis may be between 10 microseconds and 100 microseconds. In one embodiment, the antenna is a wideband antenna comprising: four half-wave dipole elements printed end to end on an outer surface of a hollow rigid dielectric cylinder; four coaxial cables each coaxial cable having a first end operatively coupled in parallel to each half-wave dipole and a second end operatively coupled to a combiner, the cables disposed within the interior of the hollow rigid dielectric cylinder; and a radome disposed on the exterior of the half-wave dipole elements configured to protect the half-wave dipole elements. The receiver may comprise an analog to digital converter, a signal processor and a clock.

According to another aspect of the disclosure, there is disclosed a non-transitory computer-readable medium having processor-executable instructions stored thereon, which instructions, when executed by a processor, cause the processor to implement a method of providing to a host system one or more frequency and bandwidth recommendations for a minimal electromagnetic interference (EMI) near-future transmission, comprising: receiving signals output from an antenna in a band of operation; analyzing the amount of EMI on each frequency within the band of operation; generating a spectrum comprising levels of EMI on each frequency within the band of operation; performing a predictive function to generate the one or more frequency and bandwidth recommendations for a minimal EMI near-future transmission; and providing the one or more frequency and bandwidth recommendation to the host system.

According to another aspect of the disclosure, a radar system is configured to adjust one or more of the transmitted waveform frequency and bandwidth to mitigate effects of electromagnetic interference (EMI), the radar system comprising: an auxiliary receiver configured to recommend to a host radar one or more frequency and bandwidth for minimal EMI near-future transmission, the auxiliary receiver comprising: an antenna configured to receive EMI signals in a band of operation of the host radar; a receiver configured to receive RF signals from the omni-directional antenna, determine EMI on each frequency within the band of operation, and output a spectrum comprising levels of received EMI on each frequency within the band of operation; and a processor configured to receive the spectrum, perform a statistical analysis to generate one or more frequency and bandwidth predictions for minimal EMI near-future host radar transmission, and output the one or more frequency and bandwidth predictions; and a host radar configured to receive the one or more frequency and bandwidth recommendations for minimal EMI near-future transmission, and to adjust one or more of the near-future transmission waveform frequency and bandwidth in accordance with the one or more frequency and bandwidth recommendations.

According to another aspect of the disclosure, a telecommunications system is configured to adjust one or more of the transmitted waveform frequency and bandwidth to mitigate effects of electromagnetic interference (EMI), the telecommunications system comprising: an auxiliary receiver configured to recommend to a host telecommunications system one or more frequency and bandwidth for minimal EMI near-future transmission, the auxiliary receiver comprising: an antenna configured to receive EMI signals in a band of operation of the host telecommunications system; and a receiver configured to receive RF signals from the omni-directional antenna, determine EMI on each frequency within the band of operation, and provide a spectrum comprising levels of received EMI on each frequency within the band of operation; and a processor configured to receive the spectrum, perform a statistical analysis to generate one or more frequency and bandwidth predictions for minimal EMI near-future host telecommunications transmission, and provide the one or more frequency and bandwidth predictions; and a host telecommunications system configured to receive the one or more frequency and bandwidth recommendations for minimal EMI near-future transmission, and to adjust one or more of the near-future transmission waveform frequency and bandwidth in accordance with the one or more frequency and bandwidth recommendations.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts and in which.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements found in typical radar systems and methods. However, because such elements are well known in the art, and because they do not facilitate a better understanding of the present invention, a discussion of such elements is not provided herein.

An aspect of the present invention involves a method to enable a radar system to operate in a crowded band (e.g. a band in which many other users are transmitting) while maintaining frequency hopping, broad instantaneous bandwidths, and extended dwell times required for full performance. The method involves rapidly analyzing a radar system's operating band over 360 degrees in azimuth and identifying short-lived interference-free time-frequency gaps. A radar scheduler is then configured to utilize the time-frequency gaps to schedule near-future burst (coherent integration period (CIP)) transmissions, thereby avoiding or minimizing experienced EMI.

Figure 1:
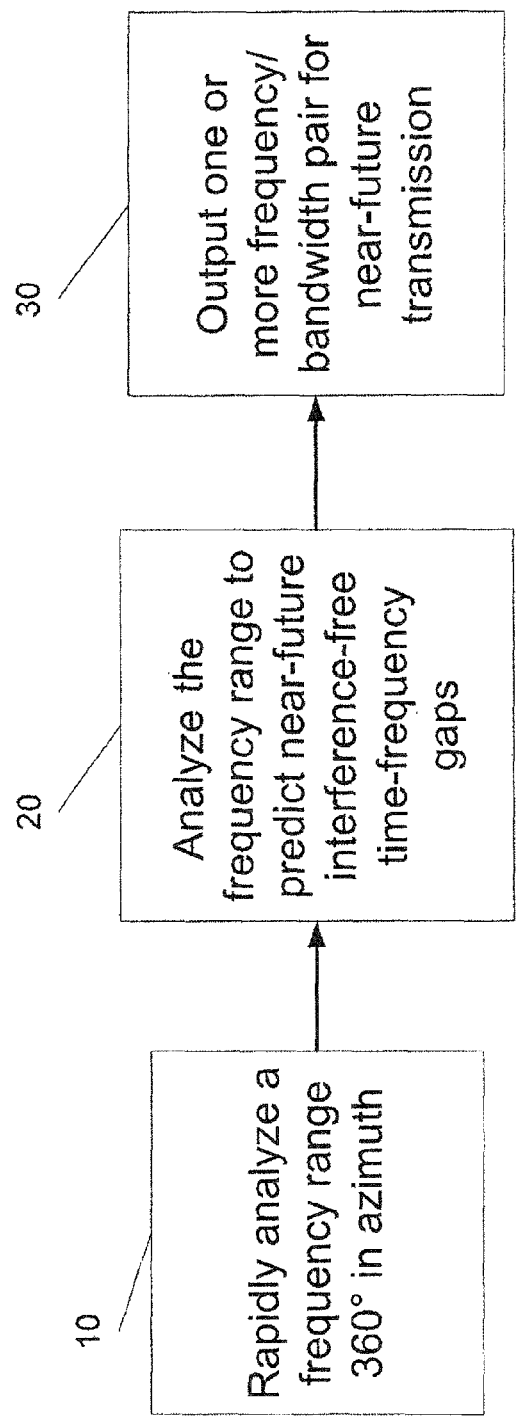
FIG. 1 shows a process flow for recommending to a host radar one or more instantaneous bandwidth and frequency pairs for near-future transmission with minimal EMI according to an exemplary embodiment of the present invention.

FIG. 1 shows a process flow useful for transmitting radar bursts in the short lived interference-free time-frequency gaps as they occur according to an aspect of the present invention. At step 10, one or more auxiliary receivers operate to rapidly analyze a frequency range over 360 degrees in azimuth. By way of example, one or more auxiliary receivers may rapidly analyze the full operating band of a radar (e.g. 420-450 megahertz (MHz) for an ultra high frequency (UHF) radar). One or more omni-directional antennas, for example a collinear dipole array antenna (discussed with reference to FIG. 6 below) may be implemented to rapidly (i.e. on the order of 10 to 100 microseconds (μs)) detect EMI over 360 degrees in azimuth. The auxiliary receiver coupled to the antenna is configured to receive the EMI and periodically generate spectrum data. The spectrum may divide the frequency range into frequency bins and may include the instantaneous amount of EMI experienced on each frequency bin within the frequency range. The auxiliary receiver may repeat this process periodically (e.g. on the order of milliseconds (ms)) and the data may be stored for statistical analysis and downstream processing, for example in a waterfall map.

Figure 2:
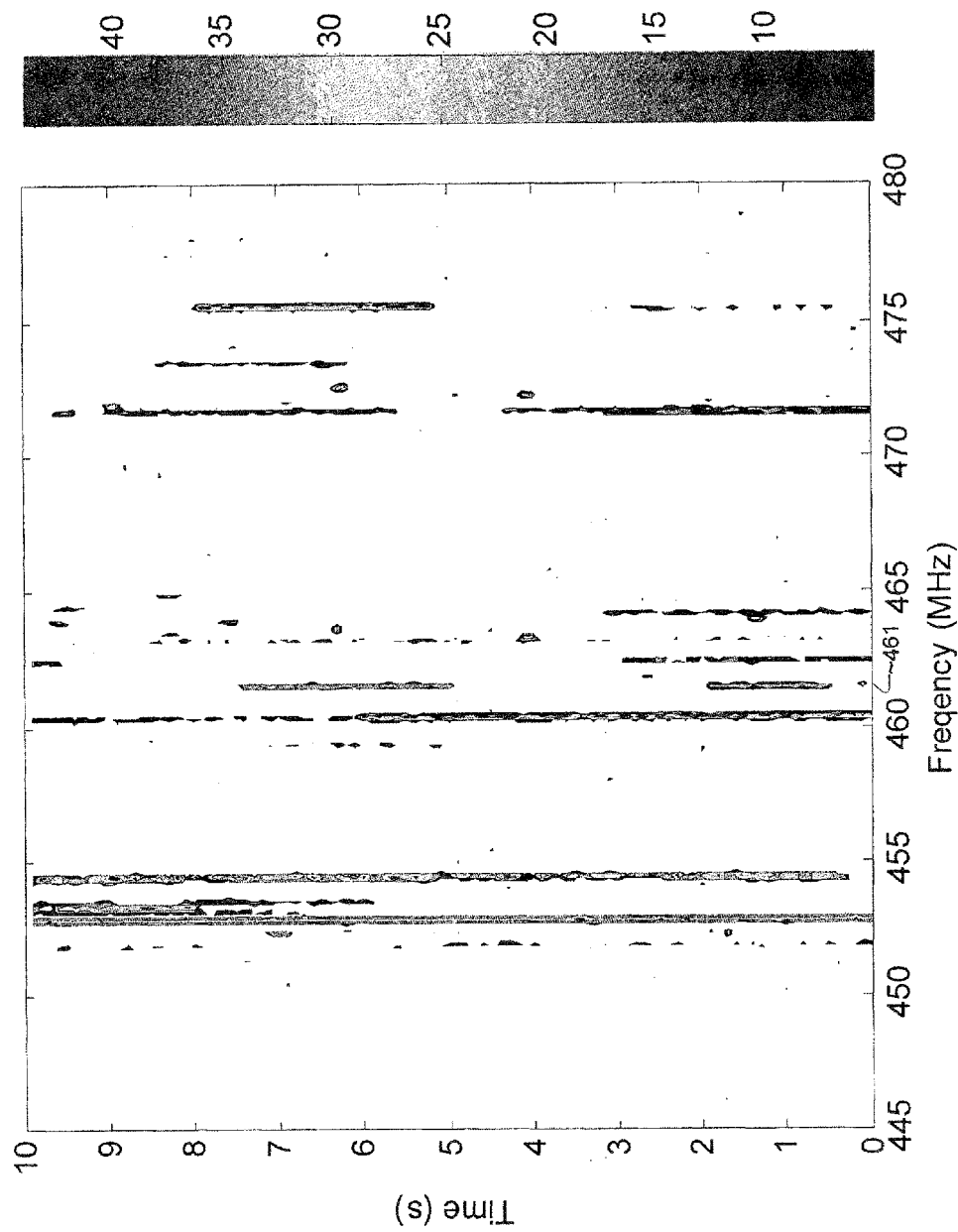
FIG. 2 shows a waterfall map illustrating, by way of example, UHF band signal intensity data over a ten second period in one direction at one particular location.

FIG. 2 shows a waterfall map illustrating UHF band signal intensity data over a ten second period. A radar utilizing a conventional clear channel search function would be configured to avoid transmission on any frequency on which EMI was detected. Accordingly, a frequency, such as that at about 461 megahertz (MHz) would be avoided. However, FIG. 2 shows that the 461 MHz frequency received no appreciable EMI from about 2 seconds to about 5 seconds or from about 7.5 seconds to about 10 seconds. Thus, the 461 MHz frequency would be an ideal frequency for transmission for these time periods even though the conventional clear channel search function would reveal 461 MHz as a frequency on which to avoid transmission.

Further, radar coherent dwells are generally on the order of 1 to 50 ms. The small time span of a dwell allows transmission in EMI free time periods substantially smaller than those shown in FIG. 2. A higher resolution scan of UHF band signal intensity would show many smaller time gaps in which a radar system could transmit without EMI.

Referring again to FIG. 1, at step 20, the auxiliary receiver analyzes the spectrum data to predict usable but short-lived interference-free time-frequency gaps as they occur. For example, a predictive function may select one or more frequencies by statistically tracking the availability of the frequencies over time. By way of example, the auxiliary receiver may predict near-future interference free time-frequency gaps by performing a predictive function including the steps of: 1) dividing a range of frequencies (e.g. the radar's operating band) into a plurality of frequency bands (e.g. 10 kHz bands for UHF); 2) analyzing the amount of EMI in each frequency band; 3) statistically tracking the length of time in which a given band maintains its availability (i.e. the duration of substantially EMI free) from the time in which it first becomes available, and the length of time (i.e. duration) in which a band experiences EMI from the time in which the EMI is first experienced; and 4) predicting how long one or more available bands will remain EMI free.

Figure 3:
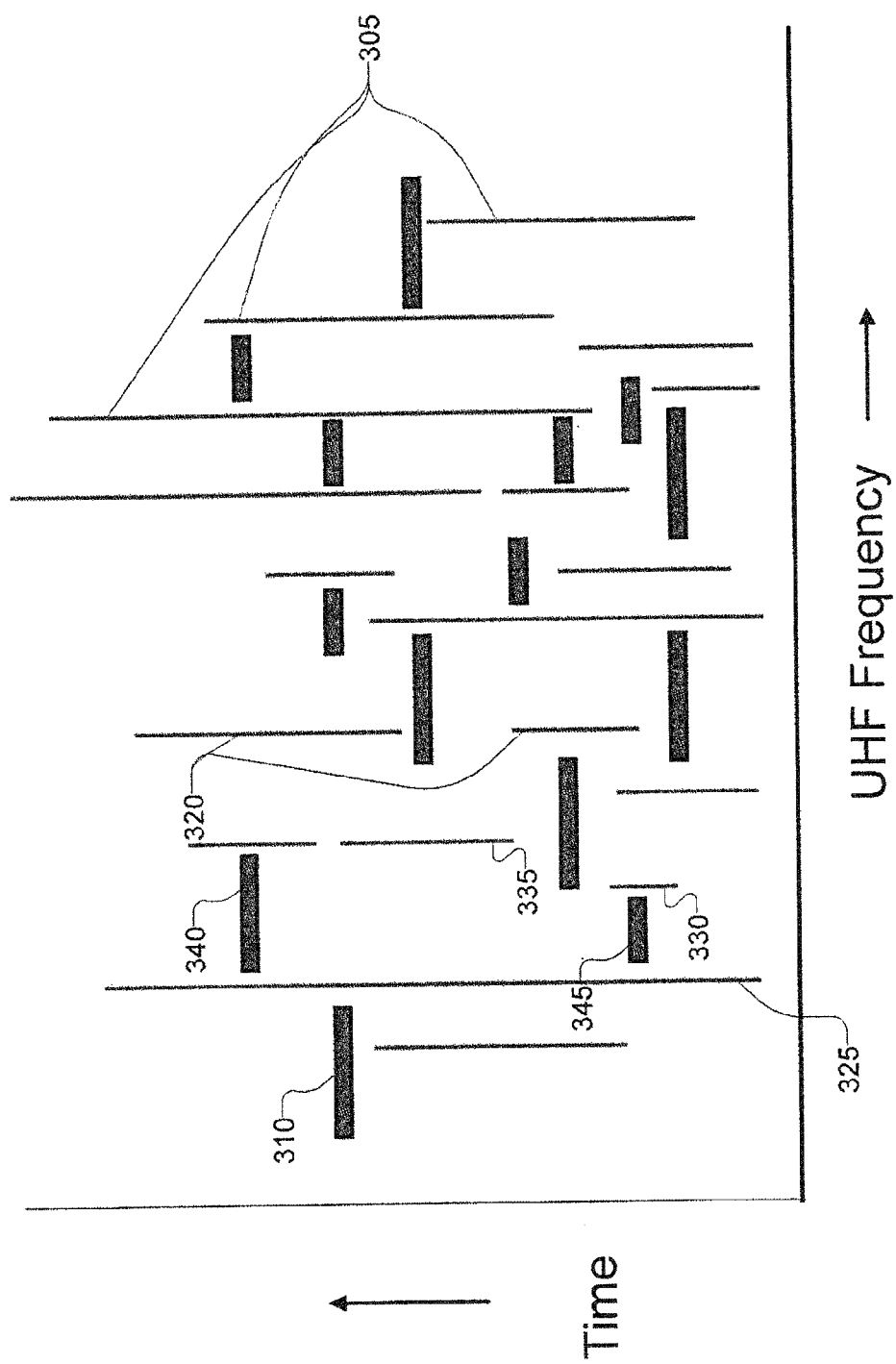
FIG. 3 shows a schematic illustration of how the auxiliary receiver recommends one or more instantaneous bandwidth and frequency pairs for near-future radar transmission with minimal EMI.

FIG. 3 shows a schematic illustration of how the predictive function predicts frequency and bandwidth pairs for near-future burst transmissions to maximize frequency diversity while avoiding EMI. Detected EMI 305 often has its duration on the order of seconds, but a frequency band only about 10 kilohertz (kHz) wide. In contrast, a radar burst labeled as 310 generally has a duration on the order of milliseconds, but has an instantaneous frequency band several MHz wide. The predictive function may be configured to analyze the history of each frequency band and compare that analysis to the most recent measurement of the given frequency band. The predictive function may then, based on that information, predict what frequency bands will be available for transmission of the next burst. For example, by observing the EMI 320 at a given frequency (e.g. 465 MHz) over a period of time, the predictive function may predict that immediately after EMI ceases on that frequency, the frequency will remain EMI free for about one half second. Thus, because the entire spectrum is updated on the order of milliseconds, upon detection of an EMI free band centered on 465 MHz, the predictive function may suggest transmission of the next burst on that frequency.

The predictive function may further be configured to analyze the history of EMI on adjacent frequency bands in the spectrum to predict an available bandwidth centered at an available frequency. By way of example, the predictive function may analyze adjacent frequency bands experiencing EMI (e.g. EMI 325, EMI 330, and EMI 335). The predictive function may determine that EMI 325 continuously has a high intensity at a given frequency band (e.g. 450 MHz), an adjacent frequency band (e.g. 453 MHz) generally experiences no EMI for a time period on the order of seconds immediately after EMI 330 ceases, and a subjacent frequency band (e.g. 455 MHz) substantially continuously experiences EMI. The predictive function may thus predict that at a first time when both EMI 325 and EMI 330 are observed, that a radar burst 345 may be transmitted with an instantaneous bandwidth of 1 MHz centered at 452 MHz. In like fashion, at a second time when EMI 330 has ceased but EMI 325 and EMI 335 continue to be observed by the predictive processor, the predictive processor may suggest transmitting a radar burst 340 with an instantaneous bandwidth of 2 MHz centered at 453 MHz. Such adjusting of bandwidth may be almost transparent to the radar system but yield great improvements in transmission by allowing the burst to fit within a gap in EMI.

Referring again to FIG. 1, at step 30 the auxiliary receiver outputs one or more instantaneous bandwidth and frequency recommendations to the host radar for the next burst transmission. In an exemplary embodiment, an auxiliary receiver may be configured to output multiple (e.g. 10) bandwidth and frequency pairs. Advantageously, by providing the radar system with multiple suggestions for next burst instantaneous bandwidth and frequency, a radar system may choose to use a least EMI bandwidth and frequency even if the radar system chooses not to transmit on one or more of the suggested instantaneous bandwidth/frequency combinations. The radar system could, for example, have constraints such as frequency bands in which it is forbidden to transmit. Additionally, typically it is advantageous for radars to transmit on diverse frequencies. By providing multiple recommendations to a host radar, the radar may optimally select diverse frequencies for transmission.

In alternative embodiments, the auxiliary receiver may provide additional information along with each bandwidth/frequency recommendation. By way of example, each bandwidth/frequency recommendation may additionally include a time when the frequency band initially became EMI free and a predicted time when the frequency band will no longer be EMI free. By way of alternative example, each bandwidth/frequency recommendation may include a validity time (e.g. ΔT) indicating how long that frequency band will predictably remain EMI free. Still other additional information may accompany each bandwidth/frequency recommendation such as an indication that an earlier prediction is no longer EMI free (e.g. if a bandwidth/frequency recommendation included a validity time of 400 μs (microseconds) and 100 μs later the recommended frequency experiences EMI, a new recommendation may indicate to the host radar that the earlier recommendation is no longer valid).

The process flow shown in FIG. 1 may repeat periodically or aperiodically according to the operation of the host radar. Additionally, the steps of the process flow of FIG. 1 may be performed at varying frequencies. By way of example, step 10 may be performed periodically or aperiodically immediately before each transmission pulse while step 30 may be performed periodically or aperiodically before each CIP (i.e. radar burst transmission).

Figure 4:
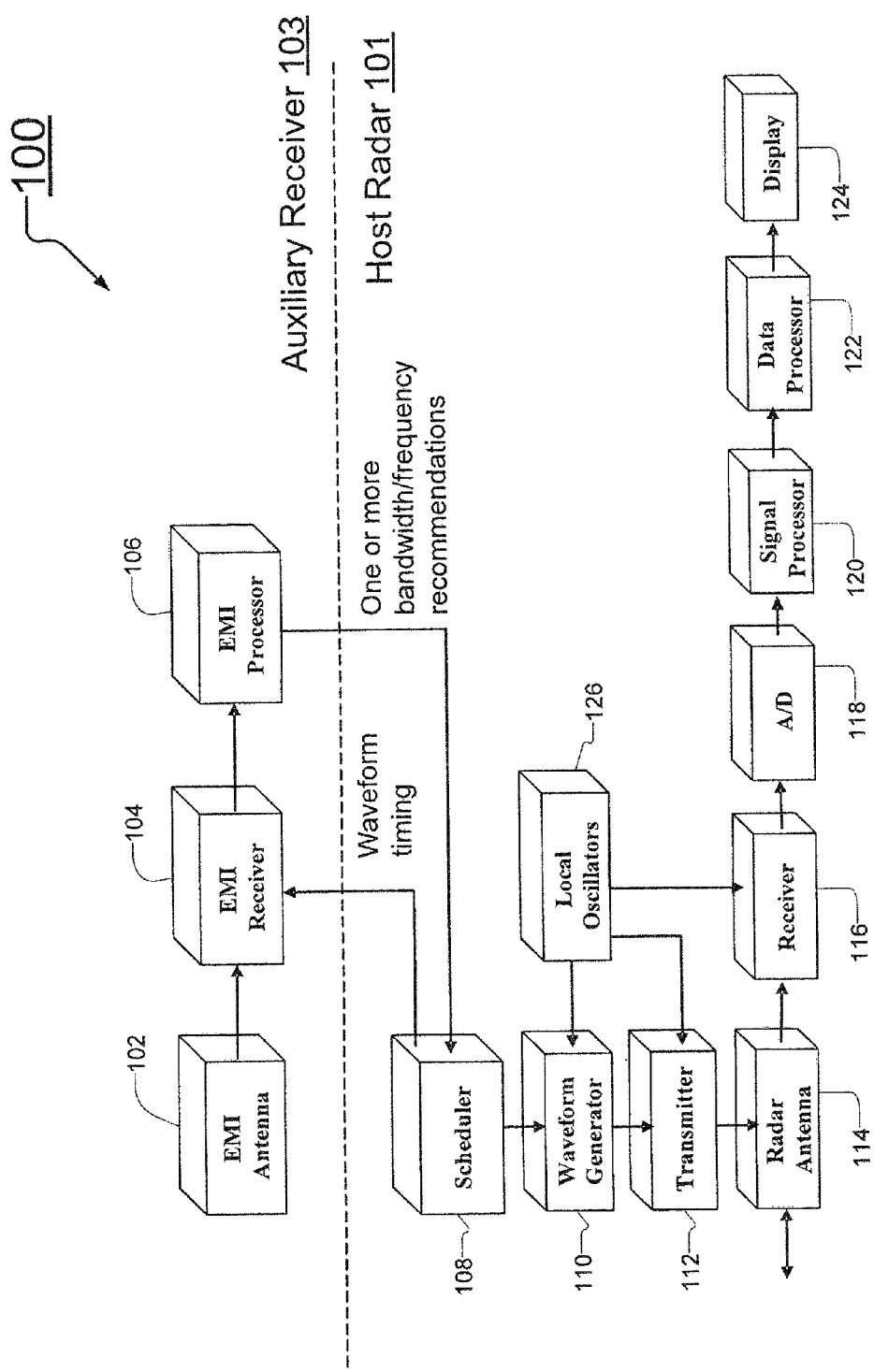
FIG. 4 shows a block diagram of the functional components of an exemplary radar system operatively coupled to an auxiliary receiver configured to recommend one or more of the transmit waveform time, frequency, and bandwidth to mitigate effects of electromagnetic interference.

FIG. 4 shows a block diagram of the functional components of an exemplary radar system 100 having an auxiliary receiver and configured to adjust one or more of the transmitted waveform frequency and instantaneous bandwidth to enable transmissions within short-lived interference-free time-frequency gaps. Radar system 100 includes a host radar 101 and an auxiliary receiver 103 operatively coupled to the host radar 101 and configured to recommend bandwidths and frequencies having least EMI to host radar 101 substantially in real-time (i.e periodically or aperiodically on the order of microseconds). Accordingly, radar system 100 may exploit short-lived interference-free time-frequency gaps.

Host radar 101 may be a typical radar configured to transmit and receive RF signals. The general components of host radar 101 are well known to those of skill in the art. Thus, in the following discussion many details of the components of host receiver 101 are omitted for purposes of clarity and brevity.

Host radar 101 includes a scheduler 108 configured to provide frequency, bandwidth and timing of signal transmissions for the radar. Scheduler 108 functions to determine where to point the radar beam (e.g. what frequency to use, what pulse repetition frequency (PRF) to use, etc.). Scheduler 108 outputs, inter alia, frequency, bandwidth, and timing of signal transmissions to a waveform generator 110. Scheduler 108 may be a typical host radar scheduler configured to receive bandwidth/frequency recommendations from one or more auxiliary receivers. Scheduler 108 creates a queue and arranges the CIPs including header information to enable the scheduler to fill the entire frequency and bandwidth list for transmission by the radar system. In alternative embodiments of the present invention, scheduler 108 may be further configured to receive additional information, such as, by way of non-limiting example, bandwidth/frequency recommendation validity time, to assist in transmission scheduling. Waveform generator 110 receives at its input transmission parameters from scheduler 108 and a clock signal (CLK) from local oscillator (LO) 126, and outputs a waveform for transmission to a transmitter 112. Transmitter 112 receives at its input a waveform from waveform generator 110 and the CLK from LO 126. Transmitter 112 is configured to generate a radio frequency (RF) signal based on the CLK from LO 126 and to modulate the RF signal with the waveform from waveform generator 112. Transmitter 112 outputs the RF signal to radar antenna 114 for transmission. Radar antenna 114 may be a typical radar antenna configured to transmit and receive signals, such as a phased array for example.

Radar antenna 114 is also configured to receive radar signals and output RF signals to a receiver 116. Receiver 116 is configured to receive RF signals from radar antenna 114 and the CLK from LO 126 and perform typical radar receiver functions, such as demodulating and filtering the RF signal. Receiver 116 outputs a signal to analog-to-digital converter (ADC) 118. ADC 118 is configured to receive an analog signal, convert the analog signal to a digital signal, and output the digital signal to signal processor 120. Signal processor 120 is configured to perform conventional radar signal processing steps, for example pulse compression, Doppler filtering, magnitude detection, and thresholding for target detection, as is well known to those skilled in the art.

Data processor 122 uses target detection data that has been passed on by the signal processor module to form trackers, which track the targets and determine target characteristics, such as trajectory, and launch and/or impact points as well as determining which targets to display. Data processor 122 is configured to perform such typical post-processing steps and may output processed data to downstream components, for example a display 124 for visual display to a user.

Auxiliary receiver 103 includes an EMI antenna 102, EMI receiver 104, and EMI processor 106. EMI receiver 102 is configured to rapidly receive RF signals over a range of frequencies 360° in azimuth. EMI antenna 102 may be, for example, a collinear dipole array antenna (see, FIG. 6). EMI antenna 102 is operatively coupled to EMI receiver 104 and configured to transmit received RF signals to EMI receiver 104.

Figure 5:
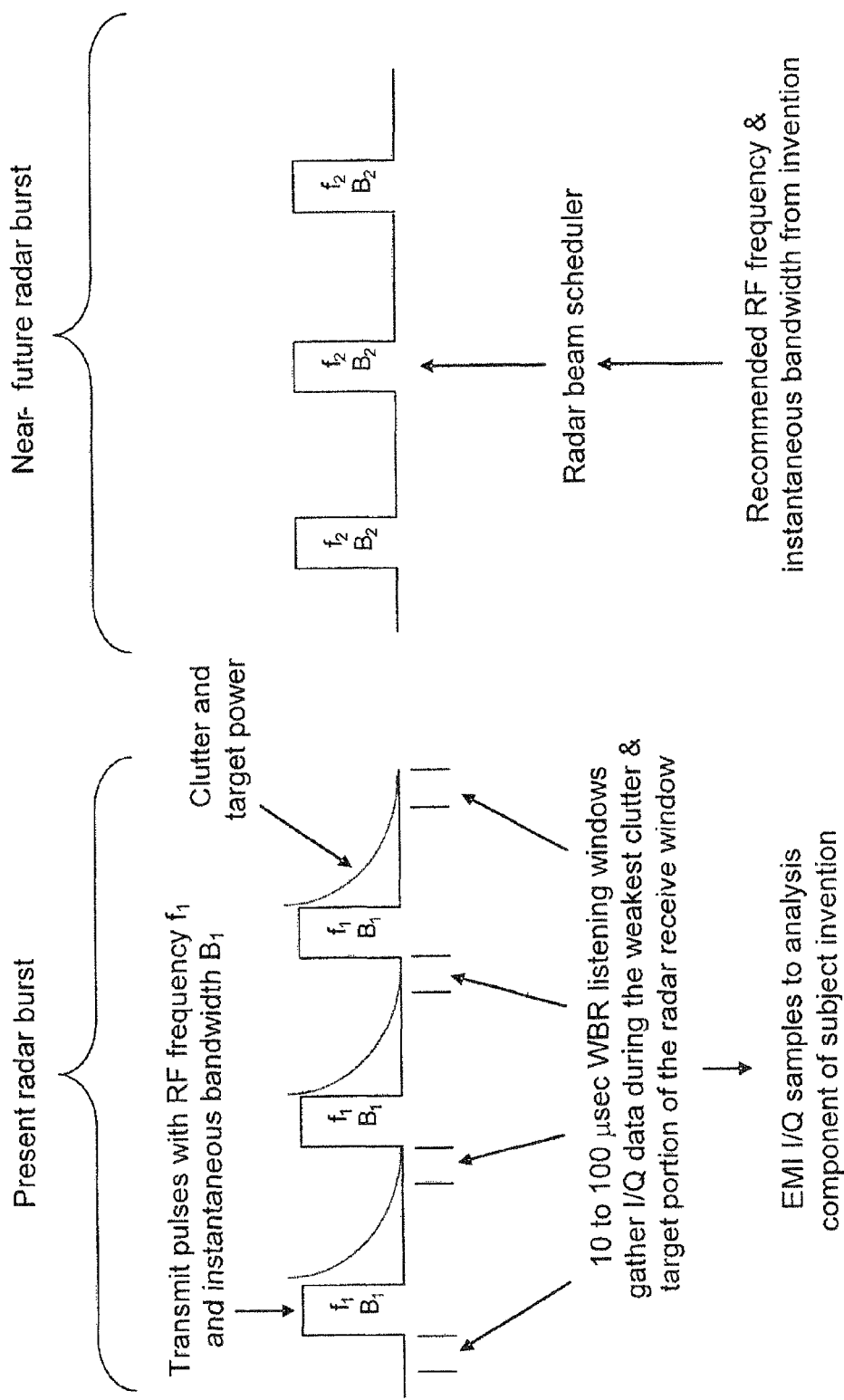
FIG. 5 shows the timing of EMI sampling by an auxiliary receiver in relation to radar transmission of a host receiver according to an embodiment of the present invention.

EMI receiver 104 is configured to receive a waveform timing signal from scheduler 108 and received RF signals from EMI antenna 102. EMI receiver 104 is configured to convert the received RF signals from EMI antenna 102 to digital form, and to output digital signals to EMI processor 106. EMI receiver 104 may be optimally configured to receive RF signals from EMI antenna 102 only during least clutter and target return power periods, as shown in FIG. 5. Referring to FIG. 5 (in conjunction with the block diagram of FIG. 4), it is shown that a maximum clutter and target return power is present immediately following each transmit pulse. EMI receiver 104 (FIG. 4) may be configured to receive RF signals from EMI antenna 102 only during "listening windows" immediately before each transmit pulse, thereby minimizing detection of EMI caused by transmissions from host radar 101 (i.e. clutter and maximizing detection of EMI caused by other sources (i.e. EMI to be avoided on future transmissions).

EMI receiver 104 utilizes the waveform timing signal received from scheduler 108 to selectively only receive RF signals from EMI antenna 102 immediately before each transmit pulse. It should be noted for general radar transmission, the pulse repetition interval (PRI) is on the order of milliseconds (2 ms for example), the transmit pulse is transmitted on the order of microseconds (e.g. 200 μs) and the receiver listening window is on the order of microseconds (e.g. 10 μs to 100 μs). Due to the very small listening window (in relation to the PRI) being oriented immediately before each transmit pulse (i.e. when target and clutter returns are minimized), false recognition rate is minimized. The only target returns that may be received by EMI antenna 102 during the listening window may be from long range (e.g. 100 kilometers (km) or more away). EMI antenna 102 may be a low gain antenna configured to only observe EMI close to the host radar 101. Thus, any interference received from long range (e.g. over 10 km) may be so weak thatl the EMI is below the thermal noise floor and is therefore insignificant.

Referring again to FIG. 4, EMI processor 106 is operatively coupled to EMI receiver 104 and to scheduler 108 within host radar 101. EMI processor 106 is configured to periodically receive data including the instantaneous amount of EMI on each frequency within the radar's band of operation. EMI processor 106 may store the received data (e.g. in a waterfall map shown in FIG. 2) and perform a statistical analysis to predict one or more frequency and instantaneous bandwidth pairs that will be EMI free or experience minimal EMI for transmission of a near-future radar burst (discussed with reference to step 20 of FIG. 1). EMI processor 106 outputs the one or more predicted minimal EMI frequency and instantaneous bandwidth pairs to host radar 101 for scheduler 108 to then select a frequency and instantaneous bandwidth for the next radar burst.

Figure 6:
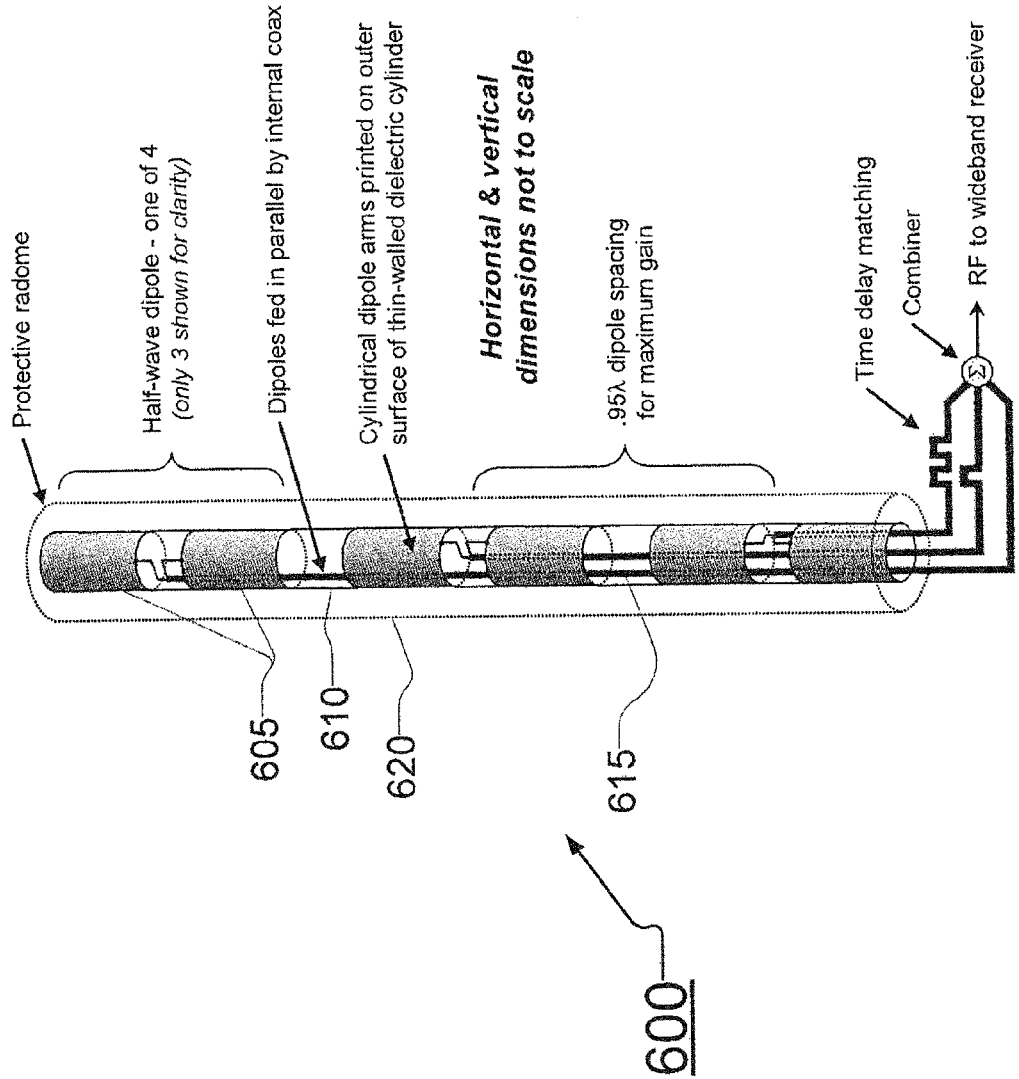
FIG. 6 shows a wideband omni-directional collinear dipole array antenna useful for rapidly analyzing a host radar's band of operation in 360° azimuth according to an embodiment of the present invention.

EMI antenna 106 may be any wideband omni-directional antenna capable of rapidly analyzing the frequency band of interest 360° in azimuth. In an exemplary embodiment, EMI antenna 106 may be embodied as a collinear dipole array antenna 600 as shown in FIG. 6. Antenna 600 includes 4 half-wave dipole elements 605 (3 shown in FIG. 6 for clarity) printed end to end on an outer surface of a hollow rigid dielectric cylinder 610 (i.e. support pole). Each dipole element 605 is fed in parallel by internal coaxial cabling 615. Coaxial cabling 615 may be selected to be specific lengths to provide time delay matching between dipole elements. The cylinder diameter may be determined by bandwidth, cabling, and dipole feed constraints. Beneficially, by requiring no additional support structure, antenna 600 may provide true 360° in azimuth coverage rather than having a conventional support pole blocking a given direction. Antenna 600 may further include a protective radome 620 to provide light weight support and protection of the dipole elements.

Antenna 600 provides several additional benefits over typical dipole antennas. Antenna 600 allows individual dipole arms to be relatively thick to thereby improve the operational bandwidth of the antenna. The inclusion of four (4) stacked collinear half-wave dipole elements additionally provides about 8.6 decibels gain (dBi) thereby providing a high gain on the horizon (i.e. a doughnut pattern toward the horizon). Antenna 600 thus provides for an inexpensive and light weight self-supporting antenna that provides high gain on the horizon over 360° in azimuth and is matched to the vertical polarization of most EMI transmitters.

Figure 7:
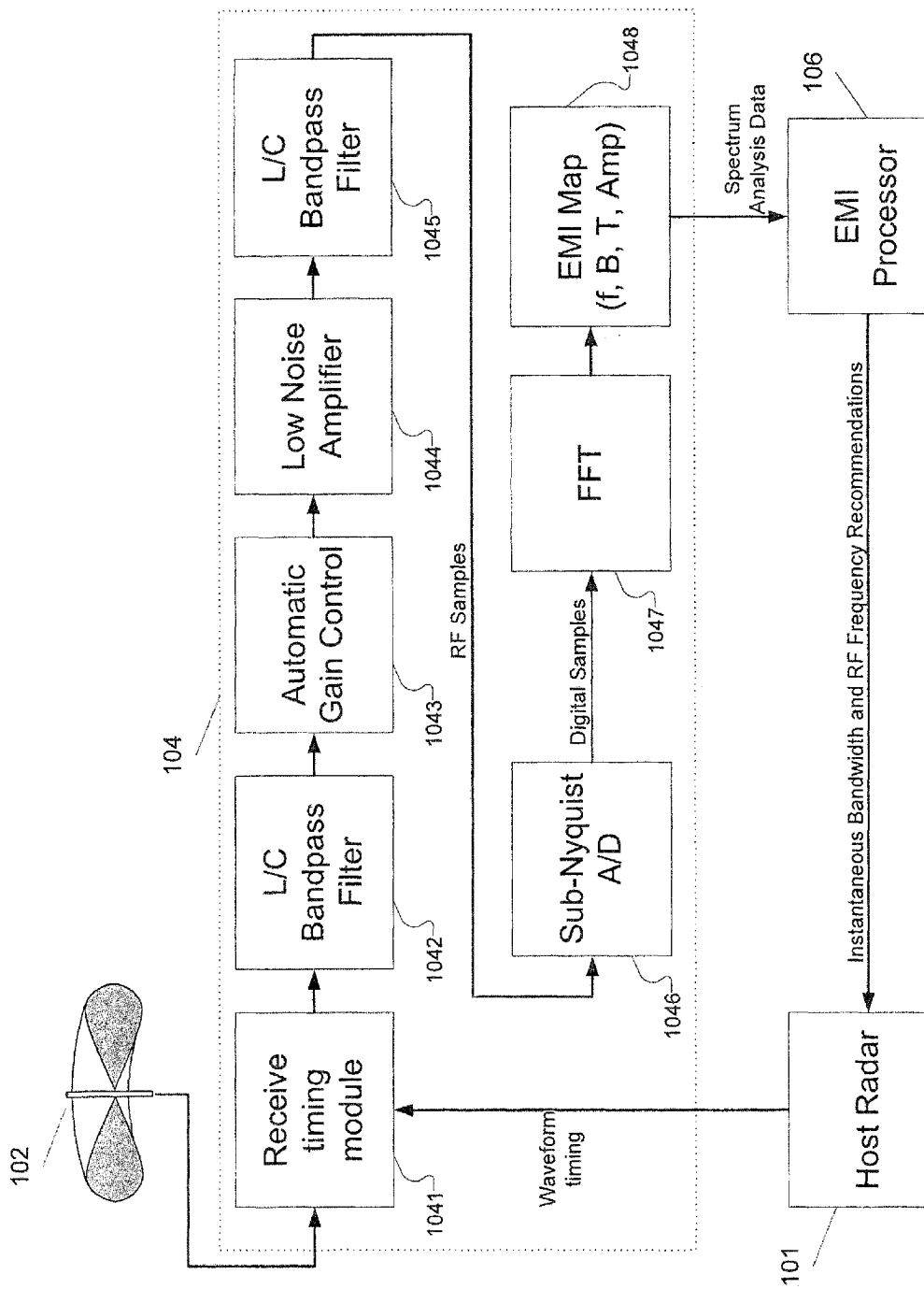
FIG. 7 shows a functional block diagram of the components of an exemplary EMI receiver according to an embodiment of the present invention.

EMI receiver 104 may comprise hardware, firmware, software, or any combination thereof. FIG. 7 shows a functional block diagram of the components of an exemplary EMI receiver 104. A receive timing module 1041 within receiver 104 may be configured to receive at inputs both RF signals from an omni-directional antenna 102 as well as timing information (e.g. pulse repetition frequency (PRF) and pulse width) from the host radar 101. The receive timing module 1041 may use the timing information to blank the receiver until it is time to receive data as discussed above with respect to FIG. 5, for example. Receive timing module 1041 of the receiver of FIG. 7 may output received RF signals to an L/C bandpass filter 1042. Bandpass filter 1042 may be configured to filter the received RF signals and output filtered RF signals to an automatic gain controller 1043. Automatic gain controller 1043 is configured to adjust the gain of the RF signal and output an adjusted RF signal to low noise amplifier 1044. Low noise amplifier 1044 is configured to amplify the filtered RF signal and output an amplified RF signal to a second L/C bandpass filter 1045. Second bandpass filter 1045 is configured to filter the received RF signal to only the band of interest and output a filtered RF signal to a sub-Nyquist analog-to-digital converter (ADC) 1046. ADC 1046 is configured to convert the received RF signal to a digital signal and output the digital signal to a fast-Fourier-transform (FFT) processor 1047. A high speed A/D converter eliminates the need for any local oscillators or mixers. FFT processor is configured to receive the digital signal from ADC 1046 and to output the spectrum analysis data (e.g. frequency, bandwidth, time, amplitude, duration) to an EMI map 1048. By way of example, use of an FFT from 0.1 msec of data to achieve typically 10 KHz resolution provides a matched filter to typical voice EMI, in addition to providing resistance against barrage interference spread across multiple frequencies. EMI map 1048 may store spectrum analysis data and may output spectrum analysis data to EMI processor 106. EMI processor 106 may then perform predictive processing to statistically analyze spectrum data over time and to output instantaneous bandwidth and frequency recommendations to host radar 101 for scheduling transmissions.

While the block diagrams of FIGS. 4 and 7 show only unidirectional communication between EMI receiver 104 and EMI processor 106, alternative embodiments of auxiliary receiver 103 may be configured to provide bidirectional communication between EMI receiver 104 and EMI processor 106. In such embodiments, EMI processor 106 may modify EMI receiver 104 parameters. By way of example only, EMI processor 106 may change the FFT or provide alternative weighting to adjust transmissions sidelobes.

Referring again to FIG. 4, EMI processor 106 may comprise hardware, firmware, software or any combination thereof. EMI processor 106 may be a processing unit (e.g. comprising a processor, memory, clock, etc.) configured to periodically (i.e. on the order of milliseconds) receive spectrum analysis data from EMI receiver 104, perform a statistical analysis (as described with reference to step 20 of FIG. 1 above), and output to a host radar one or more bandwidth and frequency pair recommendations for near-future radar transmission with minimal EMI. EMI processor 106 may further include memory for storing past spectrum analysis data, thereby enabling time/frequency comparison. EMI processor may be configured to retain in memory the spectrum analysis data for an optimal time period (e.g. on the order of seconds) thereby allowing effective statistical analysis without an undue burden of storing excessive data. Due to rapidly changing EMI environments, spectrum analysis data from distant past (e.g. greater than several seconds in the past) may no longer be relevant to the statistical analysis and may beneficially be no longer retained in memory.

While the exemplary embodiment of auxiliary receiver 103 shown in FIG. 4 illustrates separate "blocks", it is understood that any/all elements and/or functions may be implemented in greater or fewer separate discrete components. Specifically, EMI receiver 104 and EMI processor 106 may be implemented in a single component/device.

Other alternative embodiments of an auxiliary receiver 103 may be implemented by computer code stored on a computer readable medium, such as an optical drive or other memory by way of example only. The code configured to be executed performs the steps of periodically (e.g. on the order of microseconds) receiving spectrum analysis data across a range of frequencies (e.g. a radar's agile band of operation), performing a statistical analysis of the spectrum data to predict usable short-lived interference-free time-frequency gaps in EMI, and output to a host radar one or more bandwidth and frequency pairs for near-future EMI free or minimal EMI transmission and reception.

Auxiliary receiver 103 may be a discrete receiver operatively coupled to a host radar 101. By way of example only, auxiliary receiver may be mounted to a portion of a host radar and may include interface ports to allow coupling. Advantageously, having the auxiliary receiver substantially co-located with the host receiver, the auxiliary receiver may accurately analyze the EMI experienced by the host radar. Alternatively, the auxiliary receiver may be located in the general vicinity of the host radar. In still other embodiments, the auxiliary receiver may be integrated within the host receiver, the exterior of the host receiver only then having an additional omni-directional antenna.

Figure 8:
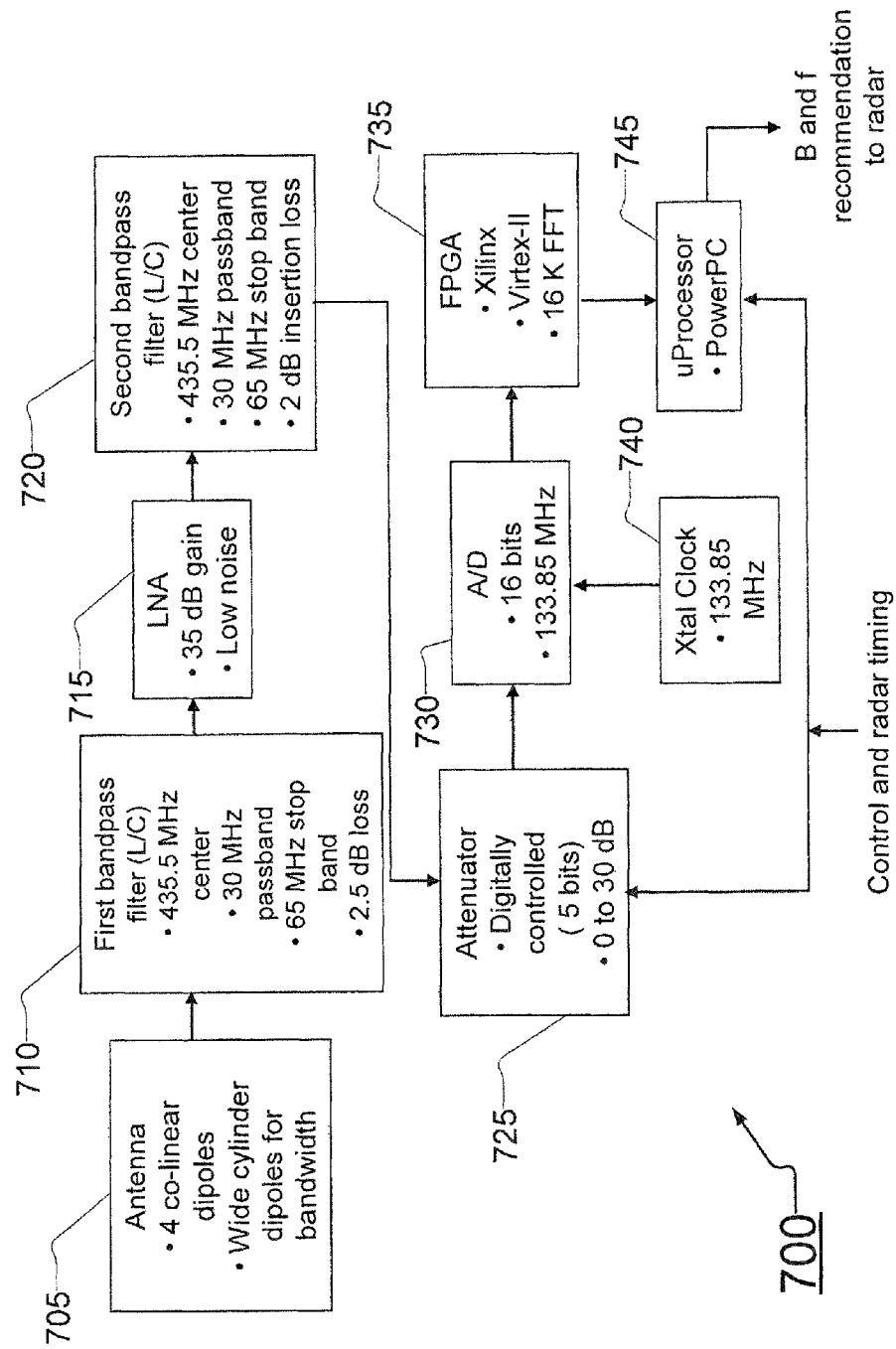
FIG. 8 shows an exemplary embodiment of an auxiliary receiver including design parameters for a host radar operating in the 420-450 MHz UHF band.

Referring to FIG. 8, an exemplary embodiment including design parameters for a 420-450 MHz UHF band auxiliary receiver 700 is shown. Antenna 705 is an omni-directional antenna such as the collinear dipole array antenna discussed with reference to FIG. 6. Antenna 705 outputs received RF signals to a first bandpass filter (UC) 710. Bandpass filter 710 filters the received RF signals and outputs filtered RF signals to low noise amplifier 715. Low noise amplifier 715 amplifies the filtered RF signal and outputs an amplified RF signal to a second bandpass filter (L/C) 710. Second bandpass filter 720 receives the amplified RF signal, filters the RF signal to only the band of interest, and outputs a filtered RF signal to an attenuator 725. Attenuator 725 receives the filtered RF signal from second bandpass filter 720 as well as control and radar timing information from a host radar (shown in FIG. 4) and outputs a reduced amplitude RE signal to a sub-Nyquist analog-to-digital converter (ADC) 730. ADC 730 receives as inputs the RF signal from attenuator 725 and a clock signal from a clock 740, converts the received RF signal to a digital signal, and outputs a digital signal to a field programmable gate array (FPGA) 735. FPGA 735 is configured to receive a digital signal from sub-Nyquist ADC 730, perform a Fast-Fourier-Transform (FFT) on the received data to generate spectrum data (i.e. the EMI on each frequency across the radar band), and output the spectrum data to a processor 745 such as a microprocessor. Microprocessor 745 is configured to receive both spectrum data from FPGA 735 and control and radar timing from the host radar (shown in FIG. 4), to perform a statistical analysis to predict near-future EMI free frequency and bandwidth pairs, and output one or more frequency and bandwidth pair recommendations to the host radar.

The EMI auxiliary receiver described with reference to FIG. 8 receives the full UHF band of 30 MHz. The desired signals are 10 kHz in bandwidth or more. Thus a receiver that tunes across the 30 MHz with a 10 kHz bandwidth is required. This is generally accomplished in the widely understood super heterodyne fashion with a 10 kHz intermediate frequency (IF) filter, but this requires a variable local oscillator (LO) which takes time to tune across the 30 MHz. The embodiment of the present invention shown in FIG. 7 instead captures the whole 30 MHz band and accomplishes the demodulation and filtering via a sub-Nyquist sampling ADC operating directly into a FFT. This design requires the sub-Nyquist ADC and FFT combination to satisfy three criteria: 1) the ADC speed must be at least twice the stop band of the 30 MHz bandpass filters (in the embodiment of FIG. 7 the stop band is about 65 MHz on the L/C filters, thereby indicating a minimum ADC speed of 130 MHz); 2) the ADC speed needs to properly fold the 420-450 MHz band down to the right Nyquist period which is one-half of the ADC speed (in effect accomplishing the required demodulation); and 3) the FFT needs to transform blocks of ADC samples for a block period of time equal to the inverse of the 10 kHz bandwidth, namely 100 microseconds (µs).

The ADC speed (i.e. sample rate) discussed with reference to FIG. 8 may be given by the equations $$f_S = \frac{2(f_{MAX} + f_{MIN})}{\alpha} \text{ and} \quad (1)$$

$$f_S > 2(f_{MAX} - f_{MIN}) \quad (2)$$

where $f_S$=the ADC sample rate in MHz, $f_{MAX}$=the maximum frequency of the band to be downconverted in MHz, $f_{MIN}$=the minimum frequency of the band to be downconverted in MHz, and $\alpha$=a scale factor. When equations (1) and (2) are satisfied with the scale factor $\alpha$ equal to an odd integer number of repetitions of the desired spectrum and its negative frequency images are equally spaced (i.e. optimally spaced) in frequency at the ADC output.

Beneficially, the high speed ADC approach of the exemplary auxiliary receiver of FIG. 8 requires no mixers and no LOs other than an inexpensive digital clock. Such a design (e.g. a software radio design) may provide a very fast and inexpensive spectrum analyzer configured to rapidly analyze a frequency range (e.g. a radar's operating band).

Embodiments of the present invention discussed herein generally describe a single auxiliary receiver operatively coupled to a single host radar, such as that described with reference to FIG. 4. Alternative embodiments may include multiple auxiliary receivers operatively coupled to a single host radar. Such an alternative design may provide benefits such as analyze a frequency range much faster. For example, the L-Band is 185 MHz wide (1215-1400 MHz) thus an embodiment of the present invention including multiple auxiliary receivers could beneficially analyze the entire band of operation much more quickly, thereby maintaining the ability to predict near-future short-lived time-frequency gaps.

The predictive function described herein with reference to embodiments of the present invention may operate to generally apply pattern recognition algorithms. In alternative embodiments, the predictive function may look for correlation of EMI on various frequencies. By way of example, multiple frequencies may be used for communication in which when a first frequency becomes EMI free, a second frequency begins receiving EMI. In still further alternative embodiments, an EMI receiver may output the modulation of the received signals to the EMI processor as well as the power of the received signals (i.e. the spectrum described above). In such an embodiment, the predictive function may utilize the modulation to predict what the received signals represent, thereby more accurately predicting their near-future operation. By way of example, an EMI receiver may receive a signal and output its magnitude, its frequency, and the waveform modulated on the signal to an EMI processor. The EMI processor may, in addition to utilizing pattern recognition algorithms, attempt to recognize the received wave form. The EMI processor may then predict what the transmitter was (e.g. a taxicab radio) and may use this information to predict its future actions.

While the above discussed embodiments of the present invention generally provide a method and system for mitigating EMI related to radar transmissions, the same method and system may generally be applied to related fields. By way of non-limiting example, telecommunication systems may implement the method of the claimed invention to transmit data with minimal EMI.

The embodiments of the present invention provide an additional benefit of minimally interfering with other transmissions. Because the embodiments of the present invention transmit on frequencies that, according to the prediction, likely will not be used by others at the same time, others will not have their transmissions interfered with by those implementing systems according to embodiments of the present invention. This may prove especially beneficial as the high power of a radar transmission may completely interfere with weaker transmissions, for example a taxi driver's radio transmission. Thus, those practicing the methods and systems of the present invention may represent friendly neighbors.

Furthermore, while embodiments of the present invention have been described herein in relation to radar systems, it is understood that the invention may be applicable to other systems, such as telecommunications systems in general.

It will be apparent to those skilled in the art that modifications and variations may be made in the method and system of the present invention without departing from the spirit or scope of the invention. It is intended that the present invention cover the modification and variations of this invention provided they come within the scope of the appended claims and their equivalents.

What is claimed is:

1. A method of providing to a host system one or more frequency and bandwidth recommendations for near future transmissions having reduced electromagnetic interference (EMI) associated with said transmissions, the method comprising:

receiving signals via an antenna over a given frequency range;

processing the received signals in an auxiliary receiver on a periodic basis to determine EMI data over the given frequency range as a function of time, frequency and bandwidth, wherein said processing of said received signals comprises dividing said given frequency range into a plurality of narrow frequency bands relative to a bandwidth of said near-future transmissions and determining the EMI data of each narrow frequency band;

statistically analyzing said EMI data to predict EMI-free frequency time slots and their duration for each narrow frequency band, identifying EMI-free time slots in adjacent narrow frequency bands defining at least one EMI-free bandwidth, to determine one or more candidate frequency and EMI-free bandwidth slots within said given frequency range, for a near future transmission at a time that does not overlap with interference of said EMI data over the duration of the near-future transmission for the candidate frequency and EMI-free bandwidth slot; and outputting to a host system data indicative of the one or more candidate frequency and bandwidth slots.

2. The method of claim 1, wherein the host system is a host radar.

3. The method of claim 2, wherein the frequency range is the band of operation of the host radar.

4. The method of claim 3, wherein the periodic basis is between 10 microseconds and 100 microseconds.

5. The method of claim 1, wherein the host system is a host telecommunications system.

6. The method of claim 5, wherein the frequency range is the band of operation of the host telecommunications system.

7. The method of claim 6, wherein the periodic basis is between 10 microseconds and 100 microseconds.

8. The method of claim 1, wherein the statistical analyzing comprises:

dividing the frequency range into a plurality of frequency bands;

determining the EMI received on every frequency band as a function of time;

tracking the continuous duration that each frequency band remains EMI free; and statistically predicting the duration that one or more EMI free frequency bands remain EMI free.

9. The method of claim 1, wherein the antenna is a collinear dipole antenna having four half-wave dipole elements printed end-to-end on an outer surface of a hollow rigid dielectric cylinder and is adapted for 360 degree operation in azimuth.

10. An auxiliary receiver configured to recommend to a host system one or more frequency and bandwidth pair for minimal electromagnetic interference (EMI) near-future transmission, the auxiliary receiver comprising:

an antenna configured to receive signals in a band of operation;

a receiver configured to receive RF signals in said band of operation from the antenna, divide said band of operation into a plurality of narrow frequency bands relative to a bandwidth of said near-future transmission, determine the EMI on each narrow frequency band, provide a spectrum comprising levels of received EMI on each narrow frequency band including time periods when each narrow frequency band experiences no EMI, and identifying EMI-free time periods in adjacent narrow frequency bands defining EMI-free bandwidths; and a processor configured to receive and statistically analyze the spectrum to predict EMI-free frequency time slots and their duration and predict EMI-free bandwidths based on said predicted EMI-free frequency time slots in adjacent narrow frequency bands to generate one or more EMI-free frequency and EMI-free bandwidth predictions for EMI-free near-future host system transmissions, and output data indicative of the one or more EMI-free frequency and EMI-free bandwidth predictions.

11. The auxiliary receiver of claim 10, wherein the host system is a radar.

12. The auxiliary receiver of claim 11, wherein the band of operation is the radar's band of operation.

13. The auxiliary receiver of claim 10, wherein the antenna is a wideband antenna comprising:

four half-wave dipole elements printed end to end on an outer surface of a hollow rigid dielectric cylinder;

four coaxial cables each coaxial cable having a first end operatively coupled in parallel to each half-wave dipole and a second end operatively coupled to a combiner, the cables disposed within the interior of the hollow rigid dielectric cylinder; and a radome disposed on the exterior of the half-wave dipole elements configured to protect the half-wave dipole elements.

14. The auxiliary receiver of claim 10, wherein the receiver comprises an analog to digital converter, a signal processor and a clock.

15. The auxiliary receiver of claim 10, wherein the host system is a host telecommunications system.

16. The auxiliary receiver of claim 15, wherein the band of operation is the telecommunications system's band of operation.

17. A non-transitory computer-readable medium having processor-executable instructions stored thereon, which instructions, when executed by a processor, cause the processor to implement a method of providing to a host system one or more frequency and bandwidth recommendations for a minimal electromagnetic interference (EMI) near-future transmission, comprising:

receiving signals output from an antenna in a band of operation;

processing the received signals on a periodic basis to determine EMI data over the band of operation as a function of time, frequency and bandwidth, wherein said processing of the received signals comprises dividing the band of operation into a plurality of narrow frequency bands relative to a bandwidth of said near-future transmission and determining EMI data for each narrow frequency band;

generating a spectrum comprising levels of EMI on each narrow frequency band within the band of operation including time durations in which each narrow frequency band experiences no EMI;

statistically analyzing said spectrum to predict EMI-free frequency time slots and their duration for each narrow frequency band, identifying EMI-free time slots in adjacent narrow frequency bands to define at least one EMI-free bandwidth to determine one or more candidate frequency and EMI-free bandwidth slots within said band of operation for said near-future transmission at a time that does not overlap with interference of the EMI data over the duration of the near-future transmission for the candidate frequency and EMI-free bandwidth slot;

providing the one or more frequency and EMI-free bandwidth recommendation to the host system.

18. A radar system configured to adjust one or more of the transmitted waveform frequency and bandwidth to mitigate effects of electromagnetic interference (EMI), the radar system comprising:

an auxiliary receiver configured to recommend to a host radar one or more frequency and bandwidth for minimal EMI near-future transmission, the auxiliary receiver comprising:

an omni-directional antenna configured to receive EMI signals in a band of operation of the host radar;

a receiver configured to receive RF signals from the omni-directional antenna, divide said band of operation into a plurality of narrow frequency bands relative to a bandwidth of a near-future transmission of said host radar and determine EMI on each narrow frequency band within the band of operation including time periods when each narrow frequency band experiences no EMI, and output a spectrum comprising levels of received EMI on each narrow frequency band within the band of operation; and a processor configured to receive the spectrum, perform a statistical analysis to predict EMI-free frequency time slots and their duration for each narrow frequency band, identify EMI-free times slots in adjacent narrow frequency bands defining at least one EMI-free bandwidth, generate one or more candidate frequency and bandwidth predictions for EMI-free near-future transmission by the host radar at a time that does not overlap with interference of said EMI, and output the one or more candidate frequency and bandwidth predictions to said host radar; and wherein the host radar is configured to receive the one or more candidate frequency and bandwidth recommendations for EMI-free near-future transmission, and to adjust one or more of the near-future transmission waveform frequency and bandwidth, selecting a frequency and bandwidth recommendation in which the recommended bandwidth is greater than or equal to a required instantaneous bandwidth of the one or more near-future transmission in accordance with the one or more candidate frequency and bandwidth recommendations.

19. A telecommunications system configured to adjust one or more of the transmitted waveform frequency and bandwidth to mitigate effects of electromagnetic interference (EMI), the telecommunications system comprising:

a host telecommunications system;

an auxiliary receiver configured to recommend to said host telecommunications system one or more frequency and bandwidth for EMI-free near-future transmission, the auxiliary receiver comprising:

an omni-directional antenna configured to receive EMI signals in a band of operation of the host telecommunications system, and;

a receiver configured to receive RF signals from the omni-directional antenna, divide said band of operation into a plurality of narrow frequency bands relative to a near-future transmission of said host telecommunications system, determine EMI on each narrow frequency band within the band of operation including time periods when each narrow frequency band experiences no EMI, and provide a spectrum comprising levels of received EMI on each narrow frequency band within the band of operation; and a processor configured to receive the spectrum, perform a statistical analysis to predict EMI-free frequency time slots and their duration, identify EMI-free time slots in adjacent narrow frequency bands defining at least one EMI-free bandwidth, generate one or more frequency and bandwidth predictions for EMI-free near-future host telecommunications, and provide the one or more frequency and bandwidth predictions to said host telecommunication system; and wherein said host telecommunications system is configured to receive one or more frequency and bandwidth recommendations for EMI-free near-future transmission, and to adjust one or more of the near-future transmission waveform frequency and bandwidth, selecting a frequency and bandwidth recommendation in which the EMI-free bandwidth is greater than or equal to a required instantaneous bandwidth of the one or more near-future transmission in accordance with the one or more frequency and bandwidth recommendations.

20. The telecommunications system of claim 19, wherein said omni-directional antenna comprises a plurality of collinear half-wave dipole elements arranged end to end.

\* \* \* \* \*